United States Patent

[11] 3,587,554

| [72] | Inventor | Carl J. Nelson<br>Elmira, N.Y. |
|---|---|---|
| [21] | Appl. No. | 777,056 |
| [22] | Filed | Nov. 19, 1968 |
| [45] | Patented | June 28, 1971 |
| [73] | Assignee | Corning Glass Works<br>Corning, N.Y. |

[54] SAW BLADE WITH WAVY EDGE FOR CUTTING AND GRINDING GLASS CERAMIC TUBING
3 Claims, 4 Drawing Figs.

| [52] | U.S. Cl. | 125/15, 51/206 |
|---|---|---|
| [51] | Int. Cl. | B28d 1/04, B24d 7/00 |
| [50] | Field of Search | 125/15, 18; 51/206, 207, 209 |

[56] References Cited

UNITED STATES PATENTS

| 824,946 | 7/1906 | McKay | 125/18 |
|---|---|---|---|
| 927,164 | 7/1909 | Puffer | 125/154X |
| 1,912,069 | 5/1933 | Doermann | 51/207 |
| 2,811,960 | 11/1957 | Fessel | 125/15 |
| 3,353,526 | 11/1967 | Daem | 125/15 |
| 3,494,348 | 2/1970 | Lindblad | 51/209X |

*Primary Examiner*—Harold D. Whitehead
*Attorneys*—Clarence R. Patty, Jr. and William D. Fosdick ABSTRACT: A saw blade having a circular peripheral region having side and cutting edge portions formed on an abrasive material and presenting a wavy appearance when viewed in the plane of the blade and when viewed in cross section parallel to the cutting edge. The blade is useful for cutting glass and ceramic tubing and for simultaneously grinding the cut ends thereof.

PATENTED JUN28 1971 3,587,554

INVENTOR.
Carl J. Nelson
BY
William D. Fosdick
AGENT

SAW BLADE WITH WAVY EDGE FOR CUTTING AND GRINDING GLASS CERAMIC TUBING

BACKGROUND OF THE INVENTION

In general, in the cutting of glass tubing, particularly tubing having thick walls, it has been necessary to make a rough cut through the glass wall by use of a suitable blade or saw. In order to minimize the power required, cutting is effected by revolving the cutting device about the circumference of the tubing and by cutting through only a fraction of the thickness of the tubing during each revolution of the cutting device. Subsequently, in a separate operation, it has been necessary to grind the cut end surface to render the tubing suitable for such uses as inclusion in pipe couplings. The necessity for the subsequent grinding operation has resulted from the fact that in thick tubing the heat generated by friction between the tubing and the saw blade causes cracks or checks to develop in the wall of the tubing, thus making it unsuitable for use in a pipe system without subsequent grinding. Attempts to reduce the heat produced by friction by supplying a coolant at the point of cutting were unsuccessful since the coolant cooled only the outer surface of the tubing, while the area near the base of the cut remained hot. In addition, since thick-walled glass tubing is generally cut in a series of stages, the blade passing only part way through the wall thickness at each stage, particles cut from the glass by the blade tended to wedge between the blade and the glass at the base of the cut, thereby causing further destruction of the glass and binding of the blade. It was to avoid these difficulties that the present saw blade was designed.

SUMMARY OF THE INVENTION

In order to avoid the aforementioned problems, the present invention provides a saw blade having a peripheral cutting and grinding portion in which the cutting edge and at least one adjacent side portion are formed of an abrasive material and in which the said side portion of the peripheral area is wavy when viewed in the plane of the blade and when viewed in cross section parallel to the cutting edge.

DESCRIPTION OF THE PREFERRED EMBODIMENT

Figure 1:
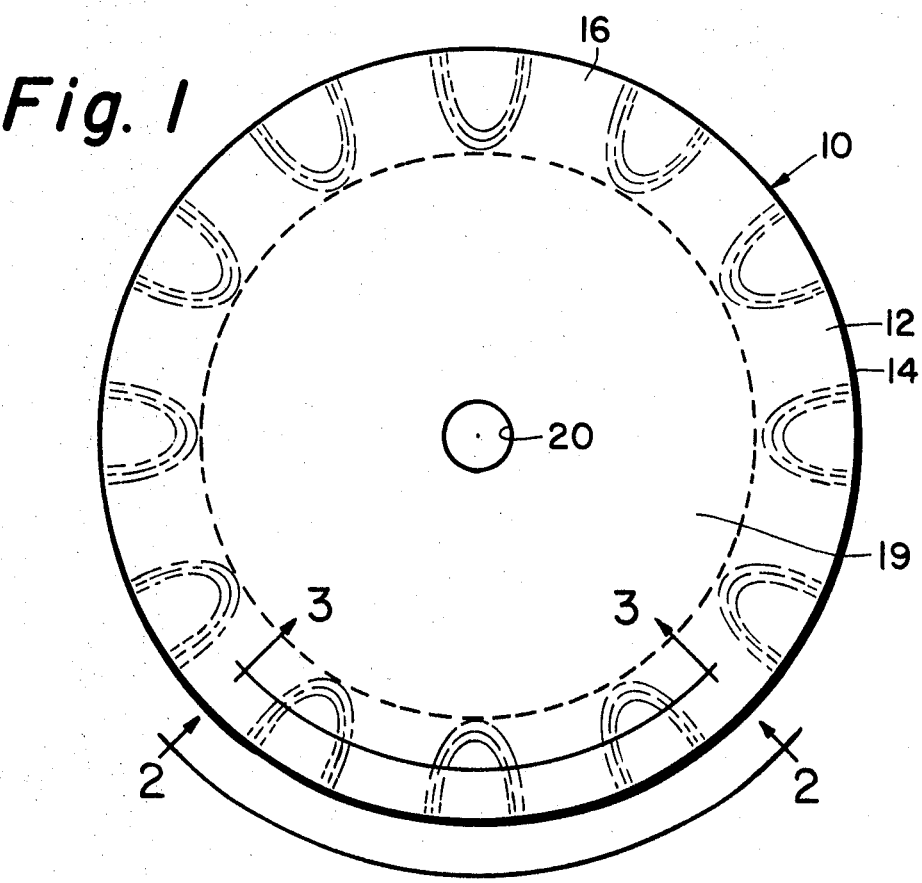
FIG. 1 is a plan view of a saw blade according to the preferred embodiment of the invention.

Referring to the drawing, in its preferred embodiment the saw blade has a blade body 10 which has a peripheral cutting and grinding portion 12, delineated by the broken line in FIG. 1. Cutting and grinding portion 12 includes a circular cutting edge 14 and two side portion grinding surfaces 16 and 18. The blade is provided with a central aperture 20 to facilitate connection through a hub to driving means.

Figure 2:
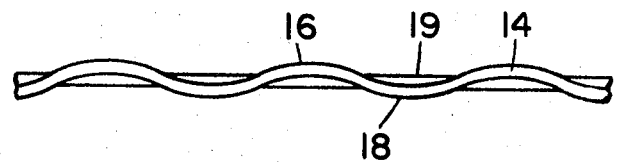
FIG. 2 is an edge view taken on line 2-2 of FIG. 1.
Figure 3:
FIG. 3 is a sectional view taken on line 3-3 of FIG. 1.

As illustrated in FIGS. 2 and 3, each of side portion grinding surfaces 16 and 18 when viewed from the edge of the blade and generally in the plane of the blade and when viewed in cross section parallel to cutting edge 14 is generally sinusoidal in shape. The sinusoidal curve becomes progressively flatter toward the center of the blade, the curved side portion merging with central portion 19 both surfaces of which are flat. Each of surfaces 16 and 18, as well as cutting edge 14, is formed of an abrasive material, such as silicon carbide particles embedded in an elastomer base. Preferably, the entire saw blade is formed of this material as a monolithic structure.

It is customary when cutting thick-walled glass tubing to effect relative motion between the saw and the tubing such that the line of contact therebetween progresses around the circumference of the tubing. Since large amounts of power are required to cut glass, it is customary to cut through only a fraction of the thickness of the glass wall at one time, making several revolutions around the tubing in order to effect complete severance. As a result, during each revolution except the final one, in which severance is completed, there is a tendency for the dislodged particles of glass to become wedged between conventional saw blades and the tubing, thereby increasing the frictional force between the saw blade and the tubing and frequently causing cracks in the tubing. The present saw blade permits such particles to fall away due to the existence of spaces between the cut end of the glass tubing and the wavy cutting and grinding portion of the saw blade. Furthermore, these spaces permit coolant to be supplied to the cutting area to its full depth. As a result, the entire cutting area is cooled substantially equally, and cracks due to thermal stress are avoided. Since only one side of the blade at any location around its periphery is in contact with the glass tubing at any one time, the saw may be operated with approximately 50 percent of the power required to operate a conventional blade, wherein both sides of the blade contact glass at all times.

Since abraded particles are removed from the cutting area, while at the same time thermal stresses are avoided, the abrasive action of grinding surfaces 16 and 18 is sufficient to grind the end surfaces of the cut glass tubing to a smoothness sufficient to permit the ends to be joined to coupling gaskets in sealing relationship without further processing. Thus, whereas with conventional flat saw blades a separate grinding operation was required, cutting and grinding are effected by the present saw blade in a single operation.

Figure 4:
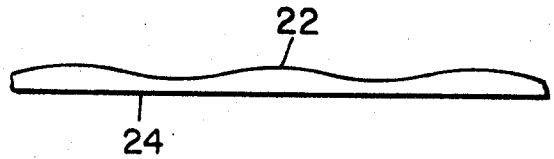
FIG. 4 is an edge view similar to that of FIG. 2 of an alternative form of blade within the scope of the invention.

If it is desired to produce a finished surface on only one tubing end surface, only one peripheral side portion of the blade need by wavy, the other peripheral side portion being of any desired configuration and being formed of any desired material. Such configuration is illustrated in FIG. 4, which is an edge view similar to that of FIG. 2 showing a blade having a flat surface 24 and a wavy surface 22.

The principle of the present invention may be applied not only to circular saw blades but also to reciprocating saw blades having straight cutting edges, in which case the blade will similarly appear wavy when viewed from the edge.

It will be understood that blades according to the present invention may be formed of other materials, and that although the illustrated blade is formed of solid silicon carbide, it is possible to form only the surfaces of the cutting edge and one or more peripheral side portion of abrasive material. Although a generally sinusoidal curve is preferable, it will be appreciated that other wavy curves may be employed.

Although the utility of the blade of the invention has been described in reference to its utility in cutting glass tubing, it will be appreciated that the blade is useful in cutting glass articles of other configurations, such as flat glass and glass rods.

Inasmuch as the foregoing description has been provided solely as that of a preferred embodiment of the invention, it is intended that the present invention be limited only by the scope of the appended claims.

I claim:

1. A circular saw blade for cutting glass or ceramic tubing and for simultaneously grinding at least one of the cut ends thereof, said saw blade comprising:
   a. a circular, central blade body portion having flat sides and a central aperture to facilitate connection through a hub to driving means;
   b. an integral peripheral annular cutting and grinding portion extending radially outwardly from said central blade body portion, and including:
      i. a circular peripheral cutting edge for cutting said tubing; and
      ii. two annular peripheral side portions adjacent to said cutting edge and located on opposite sides of said cutting and grinding portion;
   c. said cutting edge and at least one of said side portions having at least their surfaces formed of embedded abrasive material;

d. the surface of said at least one side portion serving to grind one of the tubing end surfaces produced by said cutting edge;
e. said cutting edge being of wavy configuration when viewed from the edge of the blade; and
f. the surface of said at least one side portion being of wavy configuration when viewed from the edge of the blade, and said wavy configuration becoming progressively flatter toward said central blade body.

2. A circular saw blade according to claim 1 in which the surface of each of said side portions is curved generally sinusoidally when viewed from the edge of the blade, said sinusoidal curves progressively decreasing in amplitude as they approach said central blade body, said side surfaces serving to grind the tubing end surfaces, as produced by said cutting edge, to a smoothness sufficient to permit the tubing ends to be joined to coupling gaskets in sealing relationship without further processing.

3. A circular saw blade according to claim 1 in which the surface of the other of said peripheral side portions, when viewed from the edge of the blade, is flat, is free of abrasive material, lies in the same plane as one of the sides of said central blade body portion and is normal to said peripheral cutting edge.